(12) United States Patent
Kuusinen et al.

(10) Patent No.: US 11,009,846 B2
(45) Date of Patent: May 18, 2021

(54) EVACUATION CONTROLLER

(71) Applicant: KONE Corporation, Helsinki (FI)

(72) Inventors: Juha-Matti Kuusinen, Helsinki (FI); Marja-Liisa Siikonen, Helsinki (FI); Janne Sorsa, Helsinki (FI); Sergey Kitov, Helsinki (FI); Mirko Ruokokoski, Helsinki (FI)

(73) Assignee: KONE CORPORATION, Helsinki (FI)

( * ) Notice: Subject to any disclaimer, the term of this patent is extended or adjusted under 35 U.S.C. 154(b) by 72 days.

(21) Appl. No.: 15/603,041

(22) Filed: May 23, 2017

(65) Prior Publication Data
US 2017/0261959 A1    Sep. 14, 2017

Related U.S. Application Data

(63) Continuation of application No. PCT/FI2014/050980, filed on Dec. 10, 2014.

(51) Int. Cl.
G05B 21/00    (2006.01)
G01M 1/38    (2006.01)
G05B 13/00    (2006.01)
G05B 15/00    (2006.01)
G05D 23/00    (2006.01)
G05B 19/042    (2006.01)
G06Q 10/04    (2012.01)
(Continued)

(52) U.S. Cl.
CPC ............ *G05B 19/0428* (2013.01); *B66B 1/28* (2013.01); *B66B 3/00* (2013.01); *B66B 5/021* (2013.01); *B66B 25/00* (2013.01); *G01C 21/206* (2013.01); *G06Q 10/047* (2013.01); *G06Q 10/063* (2013.01); *G05B 2219/24024* (2013.01); *G05B 2219/2642* (2013.01); *Y02B 50/00* (2013.01)

(58) Field of Classification Search
CPC .. B66B 1/28; B66B 25/00; B66B 3/00; B66B 5/021; G01C 21/206; G05B 19/0428; G05B 2219/24024; G05B 2219/2642; G06Q 10/047; G06Q 10/063; Y02B 50/24; Y04S 10/54
See application file for complete search history.

(56) References Cited

U.S. PATENT DOCUMENTS 7,579,945 B1 *  8/2009  Richter .................. G08B 25/14
                                              340/286.14
10,192,411 B2 *  1/2019  Wedig .................... G08B 7/066
(Continued)

FOREIGN PATENT DOCUMENTS

EP    2 192 074 A1    6/2010

*Primary Examiner* — Zhipeng Wang
(74) *Attorney, Agent, or Firm* — Birch, Stewart, Kolasch & Birch, LLP

(57) ABSTRACT

Modern large buildings and public places are equipped with a plurality of elevators, exits and points of interest for fluent movement. The passenger flows in a building or public place can be traced and modelled by using statistics and information regarding current state of the modelled building or public place. The information derived from this model can be used for controlling elevators, escalators and similar in the building more efficiently. The same information may be used also for guiding passengers in the building or public place to use other transportation means so that the duration high traffic situation can be reduced or sometimes completely avoided.

10 Claims, 2 Drawing Sheets

(51) Int. Cl.
*G06Q 10/06* (2012.01)
*B66B 5/02* (2006.01)
*B66B 25/00* (2006.01)
*B66B 3/00* (2006.01)
*B66B 1/28* (2006.01)
*G01C 21/20* (2006.01)

(56) References Cited

U.S. PATENT DOCUMENTS

| | | | | |
|---|---|---|---|---|
| 2004/0163325 | A1* | 8/2004 | Parrini | B66B 5/024 |
| | | | | 52/1 |
| 2005/0190053 | A1* | 9/2005 | Dione | G08B 21/22 |
| | | | | 340/500 |
| 2007/0278044 | A1* | 12/2007 | Hikita | B66B 5/024 |
| | | | | 187/247 |
| 2008/0196978 | A1* | 8/2008 | Siikonen | B66B 5/022 |
| | | | | 187/384 |
| 2008/0302609 | A1* | 12/2008 | Siikonen | B66B 5/021 |
| | | | | 187/247 |
| 2010/0164732 | A1* | 7/2010 | Wedig | G08B 17/06 |
| | | | | 340/577 |
| 2011/0136463 | A1* | 6/2011 | Ebdon | G08B 7/066 |
| | | | | 455/404.1 |
| 2012/0276517 | A1 | 11/2012 | Banaszuk et al. | |
| 2013/0242074 | A1* | 9/2013 | Sekiguchi | G08B 7/066 |
| | | | | 348/77 |
| 2014/0139539 | A1* | 5/2014 | Byers | G09G 5/10 |
| | | | | 345/589 |
| 2015/0015401 | A1* | 1/2015 | Wedig | G08B 25/10 |
| | | | | 340/577 |
| 2015/0348220 | A1* | 12/2015 | Sharma | G06Q 50/265 |
| | | | | 705/324 |
| 2016/0161269 | A1* | 6/2016 | Needham | G01C 21/3438 |
| | | | | 701/410 |

* cited by examiner

EVACUATION CONTROLLER

CROSS REFERENCE TO RELATED APPLICATIONS

This application is a Continuation of PCT International Application No. PCT/FI2014/050980, filed on Dec. 10, 2014, which is hereby expressly incorporated by reference into the present application.

FIELD OF THE INVENTION

The invention relates to controlling movement and traffic flows in buildings public places. Particularly the invention relates to controlling elevators, escalators, information displays and similar in an evacuation situation.

BACKGROUND OF THE INVENTION

In modern buildings and public places elevators, escalators and similar devices are used for increasing comfort and for facilitating access, for example, for disabled people. In large buildings elevators are arranged into groups that can be controlled by a group controller. The group controller controls typically one group and together with other systems is responsible for smooth operation of the group. Typically the allocation of journeys is done by using destination control system and possible information of limitation of other groups.

In some implementations, such as disclosed by EP0891291, a controller controlling group controllers is used. This controller may be able combine the information received from different controllers so that, for example, transfers from an elevator to another are fluent and the efficiency of elevator system is maximized. The information used for the system as described above is received from elevator calls.

However, as the buildings are bigger than earlier the passenger flows within buildings are bigger and there is always a need for improving the passenger efficiency in order to provide fastest possible movements and to maximize the capacity of existing transportation means as it is typically very difficult to add more elevators or change the existing elevators into larger ones.

Correspondingly it is desirable to improve the fluency of passenger flows in public places that are not considered as a building. For example, subway stations, public events and similar where a lot of people needs to be transported efficiently.

The above discussed problem relates particularly to situations where a large buildings and public places need to be evacuated. The evacuation situation causes a lot more traffic than a normal traffic hour because during evacuation alarm typically the whole building needs to be evacuated, however, local high traffic can be caused also when only a portion of the building or public place is to be evacuated.

SUMMARY

Modern large buildings and public places are equipped with a plurality of elevators, exits and points of interest for fluent movement. The passenger flows in a building or public place can be traced and modelled by using statistics and/or information regarding current state of the modelled building or public place. The information derived from this model can be used for controlling elevators, escalators and similar in the building more efficiently. The same information may be used also for guiding passengers in the building or public place to use other transportation means so that the duration high traffic situation can be reduced or sometimes completely avoided.

In an embodiment the invention is implemented as a method for controlling public transportation means in case of evacuation. First, data from a plurality of data collection devices is received, wherein the data collection devices are configured measure passenger flows. Then the received data is analyzed. A current state of the environment based on said analyzed data is provided. As a response to an evacuation signal, evacuation instructions are displayed based on the analyzed data. In an embodiment of the invention the analyzed data is accumulated into statistics. In an embodiment of the invention at least one elevator group is controlled in order to evacuate based on said analyzed data, wherein said at least one elevator group is connected to at least one data collection device. In an embodiment of the invention at least one elevator group is controlled based on one of the following: said current state of the environment, said statistics or said traffic forecast.

In a further embodiment of the invention at least one of the following is controlled: automatic walkways, escalators, doors and lighting. In a further embodiment of the invention route instructions are displayed to passengers based on the analyzed data.

In a further embodiment the invention is implemented as a computer program for a computing device comprising code adapted to cause the method disclosed above when executed on a data-processing system.

In a further embodiment the invention is implemented as an apparatus comprising processor; at least one memory; a network connection. The apparatus is configured to receive data from a plurality of data collection devices, wherein the data collection devices are configured measure passenger flows; analyze said received data; provide a current state of the environment based on said analyzed data; and display evacuation instructions based on the analyzed data as a response to the evacuation signal. In an embodiment the apparatus is further configured to accumulate said analyzed data into statistics. In an embodiment apparatus is further configured to control at least one elevator group based on said analyzed data, wherein said at least one elevator group is connected to at least one data collection device. In an embodiment the is configured to control at least one elevator group based on one of the following: said current state of the environment, said statistics or said traffic forecast. In an embodiment the apparatus is configured to control at least one of the following: automatic walkways, escalators, doors and lighting. In an embodiment the apparatus is further configured to display route instructions for passengers based on the analyzed data.

In an embodiment the invention is implemented as a system comprising an apparatus discussed above and a plurality of data collection devices. In an embodiment of the invention data collection devices comprise at least one of the following: elevator group, camera equipment, light curtain, moving walkway, escalator and access control system.

A benefit of the invention is that by using the above invention elevator groups, escalators and similar can be used efficiently. The efficient use means using the transportation means and devices according to a determined plan, for example, by minimizing the waiting time of an average passenger or by minimizing the use of energy. A clear benefit of the invention is that it may be used so that high traffic situations are avoided by guiding passengers to alternative routes. The persons taking the alternative route avoid locations with heavy traffic completely and have more pleasant journey. Additionally by taking an alternative route they reduce traffic pressure at the avoided location.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
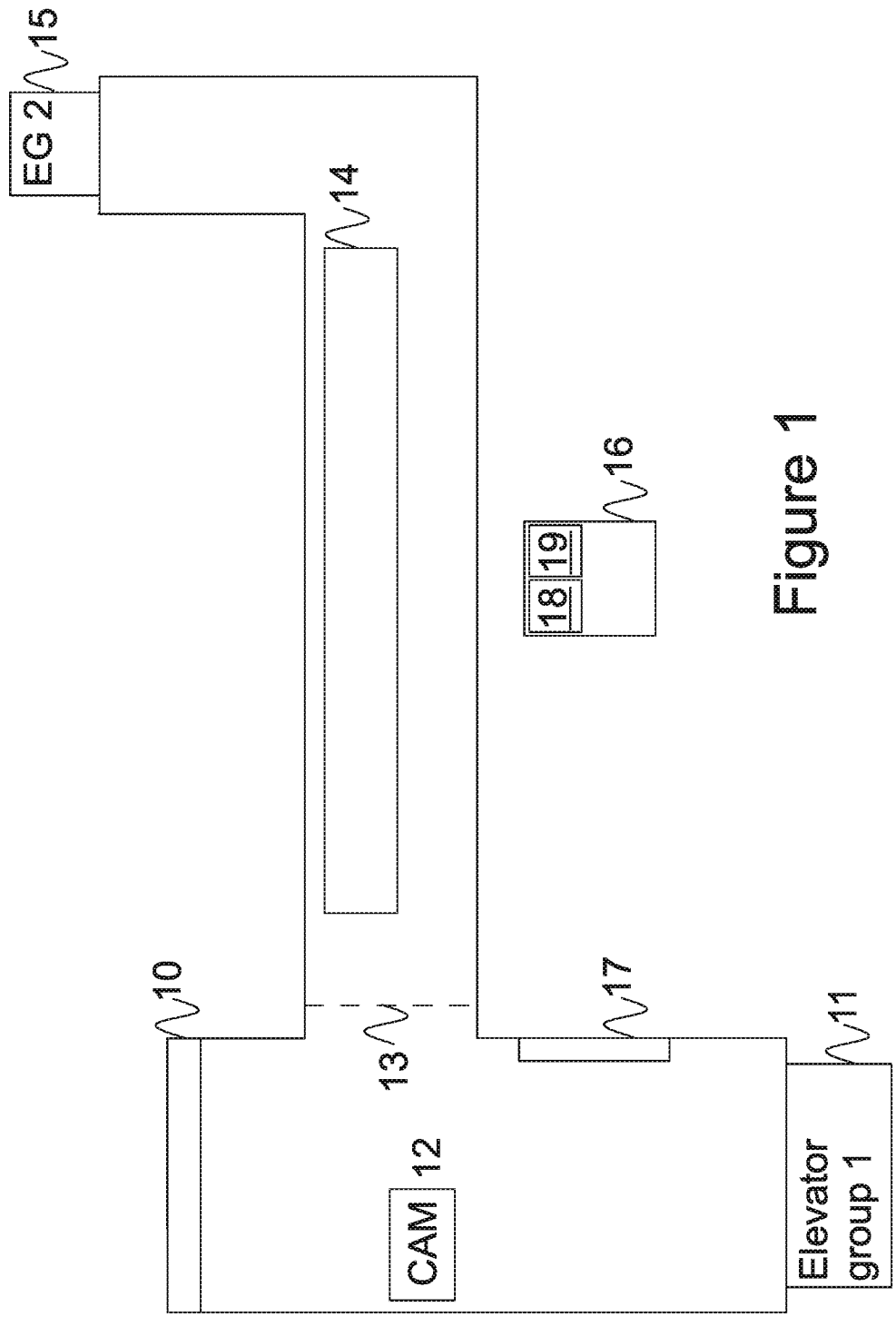
FIG. 1 is a block diagram of an embodiment according to the invention.

In FIG. 1 a block diagram of an embodiment according to the present invention is disclosed. The block diagram is partially drawn in a form of a ground plan of a building. The ground floor is illustrated here as it is necessary for understanding how the information needed by the present invention is typically collected. Furthermore, it is possible that the ground floor is not used as a destination floor in some cases but the evacuation must be performed, for example, by a tunnel to the next building or through another floor having an emergency exit. Even if it is here discussed how this information is collected, it must be understood that it is not absolutely necessary that the information is collected already at the ground floor but it may be collected only in a part of the building. However, in the most preferred embodiment the collection mechanism is implemented as complete as possible and the collection system may be further improved by using new data collection tools when the technology advances. In the building two different elevator groups 11, 15 are shown. The elevator group comprises at least one, typically a plurality of, elevator cars and a group controller. These are connected to a system controller 16 that is responsible for to smooth overall operation of all of the systems located in the building. The controller includes a processor 18 and a memory 19 for executing and storing computer programs and related data. The controller further comprises at least one network connection. The network connections, one or more, are not shown in the figure for the sake of clarity, however, a person skilled in the art understands that this connection may be done by using various network technologies including wired and wireless connections. The controller 16 is typically able to handle a plurality of different network connections directly or indirectly, however, so of the data collection devices connected to the controller 16 may be able to use only one network technology. In addition to the elevator groups the building comprises for example moving walkway 14, a main entrance 10 with access control system, additional light curtain 13 in the end of an aisle and a camera system 12 for lobby after the main entrance.

The main entrance 10 may be a controlled entrance point, for example with access gates and personnel, or it may be uncontrolled point with free access. If the main entrance 10 is controlled point information regarding persons may be collected at the access gate. The access gates may be arranged to incoming people only or both directions. The identification for access rights may be done automatically by using access cards and keys, other identification means or manually by a person at the entrance. The access cards or similar may include additional information, such as an information about handicap that requires use of wheelchair, or similar. It must be noted that in some countries this information may be subject to privacy laws and must be treated accordingly, however, the identity of a followed person needs not to be combined to the followed profile, which may be temporary. For example, when a person enters a building a temporary profile may be created and then followed when the person moves in the building. The identification information, if any exists, may be deleted from the profile when the person leaves the building. In that manner the movements of a person may be tracked and statistics explained later will be more accurate. Correspondingly a person controlling the entrance may tag that a person currently in the building has a wheelchair.

As explained, the outward traffic may be controlled similarly or it may be using other means. For example, in the embodiment of FIG. 1 there is a camera system 12 in the lobby. The camera system may comprise a plurality of cameras connected to a controlling unit that is able to detect from images the number of persons left from the building and, for example, if a person having a wheelchair has left the building. The identification may be based to just a number of persons or it may include more advanced mechanisms, such as, identifying particular persons by using machine vision based facial recognition.

In addition to the camera system the embodiment of FIG. 1 includes elevator group 11 that is equipped with a destination control system. The destination control system is capable of counting the traffic at the elevator group. Even if the embodiment of FIG. 1 is equipped with a system destination control a person skilled in the art understands that traffic may be counted also by using conventional methods with elevators not having a destination control system or the traffic can be determined completely for example based on machine vision applications. For example, the destination control system may request the number of passengers belonging to a party for each elevator call. This information may be later verified or adjusted by using further camera systems in an elevator or by estimating from the weight of the elevator car. Thus, the system can keep track of the traffic and knows how many people left and entered the elevator car in a visited floor.

In the embodiment of FIG. 1 a light curtain 13 is disclosed. The purpose of the light curtain 13 is to count the number of the persons who enter the aisle instead of going to the elevator group 11. The aisle of embodiment of FIG. 1 includes moving walkway 14 that may be equipped with corresponding counting means. In the end of the aisle is a second elevator group 15 that corresponds with the first elevator group 11.

All systems and electric arrangements mentioned above are connected to a controller 16 by using a common network connection. The controller 16 may be connected to the mentioned systems through sub-controllers. For example, an elevator group controller may be counted as a sub-controller in the context of this patent application. The controller 16 receives information from all elevators, light curtains, camera arrangements, access gates and similar and uses this information for estimating the traffic in different parts of the building or a public place, such as a subway station. The information may include volumes of traffic flows but also information about the flow, for example, how many people in the flow are in a wheelchair.

The information collected above may then be used for evacuation purposes and/or controlling the transportation means in the building. For example, as the number of persons in wheel chair has been counted and their movements are tracked it is possible to guide the person in a wheel chair to the closest elevator and perhaps even delay the elevator for facilitating smooth exit. For example, when an evacuation alarm is launched and a group of people arrives at an elevator lobby in the building, an information screen similar to information screen 17 may include information to choose elevator group 15 instead of the elevator group 11 because the capacity of the elevator group 11 is in use or because of the possible fire it is closed or it is reserved for handicapped people who cannot access elevator group 15 for some reason or it is reserved for fire department. The mentioned closure of an elevator may be depending on the time. For example, it may be determined that it is allowed to use the elevator 10 minutes after the elevator and after that the elevators will be brought down. The direction of the moving walkway may be changed to fit the transportation need caused by the alarm. When the group starts moving towards elevator group 15 a predictive elevator call may be placed for the whole group. As a response to the elevator call it is possible to receive information that stairs are recommended instead if possible, for example, for health reasons. In an evacuation situation the system may assume the destination for each person to be evacuated and instruct accordingly, however, it is naturally possible that not everybody follows the instructions given by the system. Thus, after a predictive call the allocation may be corrected for example by counting or estimating the number of passengers in an elevator. Thus, even if the elevator was assumed full based on call information, it may still do one more stop if the system notices that there is still vacancy in the elevator car. The predictive call may be placed so that the elevator car is ready and waiting when persons arrive at the elevator group 15, however, as the system knows estimated walking time the elevator group may be scheduled so that overall capacity is maximized because the aim is to evacuate everybody as fast as possible. The predictive calls discussed above may be limited so that in an evacuation situation the call can be done only to predetermined floors. Thus, the relevant information received in that case is the number of passengers.

Based on the information mentioned above the overall system may be instructed in real time, however, it is beneficial to use the information to form statistics from the traffic that reflects the behavior of the people. Furthermore, it must be understood that the real time information is also an estimate and cannot be assumed to be 100% correct, for example, because of miscounts or defected counting means. However, the system may adjust measurement results also real time and even if the real time information is not 100% accurate it will lead into improved results. As the information is not 100% accurate a person skilled in the art understands that the information is used only for controlling transportation devices and not for determining if there is still somebody in the building because the system may have a different count than the reality. Thus, even if the real time information is crucial in evacuation situation it may be improved by using statistics because as above discussed it is very difficult to collect and maintain real time information that is 100% accurate.

When collecting data, for example, if according to a destination control system there is one person in the elevator but the camera system does not see anyone, the flow may be adjusted to zero or it may be corrected so that the person left on the previous floor and should be somewhere else in the building. If the person has been identified the required correction may be done when the same person is identified again. For example, if the system assumes that the person is still in the building but he arrives at the main entrance it is obvious that the person left the building so that it was not detected. This kind of corrections help providing better real time information that can be used As explained above statistics may be used in order to support the real time information. For example, when discussing about traffic on a transfer floor for elevators, it is possible to detect some people and traffic flow directions from placed elevator calls. This flow direction information that has been collected from the movements of people can be used also when evacuation instructions are needed. However, as everybody on that floor do not place elevator cars the exact number has to be counted by using other means, for example, a machine vision system for counting the person changing elevators on that floor. This does not, however, tell the destinations of passengers even if the direction can be counted by counting persons entering an elevator travelling down and up respectively. When this information is combined into statistics having information from different moments of time the behavior can be estimated and even if the estimate cannot be 100% correct it gives a good estimate than can be used as later explained. A person skilled in the art understands that 100% cannot be achieved for a plurality of reasons, for example, some people change their plans during journeys.

As explained above a plurality of measurement means can be used when building statistics. All means must not be capable of producing the same information. As explained above a camera system may be able to detect some directions when combined with the information of elevator movements, a camera system as such typically cannot tell which direction the elevator passengers are going. Furthermore, for example, sequential light curtains may be able to count the number of persons and to indicate the direction of movement, however, they are not able identify persons. However, it is beneficial for the quality of statistics if the starting and destination locations for a person are known as this is the real behavior of a person being followed. Thus, it is possible to derive from statistics not only the starting point and the destination but also the route between them. Furthermore, without this information pairing starting and destination points is very difficult.

Figure 2:
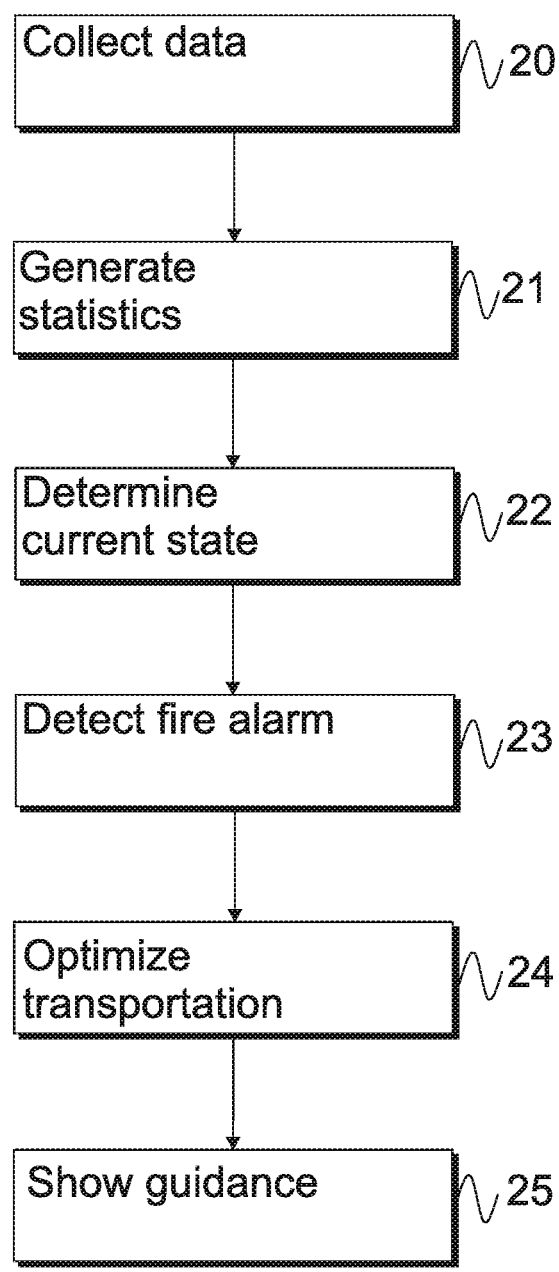
FIG. 2 is a flow chart of an example embodiment of the present invention.

The above explained mechanisms are used in an evacuating method according to FIG. 2. The mechanisms mentioned above are examples and additional means that may be used for tracking traffic flow may be used. In the method data is first collected as described above, step 20. The data is stored in a database that may be located together with the controller 16 of FIG. 1, or in an additional server that is coupled to the controller so that the collected data can be stored and later retrieved. In case of an additional server the connection between data collection means and additional server may be direct and does not need to involve controller 16. For example, camera equipment 12 may send images directly to an additional server that is capable of performing required analysis for extracting desired data. The extracted data is then stored.

After collecting data the data may be used in two different ways that may be using together. The collected data is first analyzed, step 21. The analysis may include building statistics can be built, or it can be done at a later stage. The information that can be derived from statistics gives alone a good estimate of the traffic flows in the building. For example, it is possible to check which time the persons working in an office building start lunch breaks.

In addition to statistics the current state of the system may be determined, step 22. As the current state changes a snapshot representing currents state may be produced together when collecting data and producing statistics. The current state is an estimate of the currently moving traffic flows in the building. The quality of estimate depends on various matters. For example, different buildings have different number of data collecting means with different capacities. If all persons can be tracked continuously in a building the estimate is very close to the current state. This is possible, for example, in a high security building having electric locks in all doors and a face recognizing camera system for following people who do not introduce their keys when the door is opened. On the other hand, the estimate may be poor if there is a possibility to exit the building without passing data collecting means.

In the embodiment of FIG. 2 statistics and the current state both are used as is described in the following. The collected data, in form of statistics and current state, may be used in order to optimize the performance of the transportation system of the building or a public base when a fire alarm has been detected, step 23. The optimum might mean the fastest travel times individually for each person to evacuate or largest overall throughput so that as much people as possible can get out without going to one person level in guidance.

The desired result, fast evacuation, may be achieved by using different transportation means so that the result is achieved and/or instructing to people to use alternative routes to get out of the building or public place. In a typical situation both are used and the transportation means are optimized from bringing people out of the building, step 24. This optimization may naturally take into account the location of the fire alarm. Thus, people who are located closest to the fire may be evacuated first or if there are other possibly dangerous aspects these may be taken into account so that people in most dangerous location are evacuated first. For example, if there is heavy traffic in elevators it is possible to instruct people to take stairs instead of an elevator or to instruct to use a different elevator group if possible, step 25. Then, based on the reactions of the passengers the other elevator group may be instructed to move elevator cars to relevant floors so that the elevator group is ready when the traffic reaches it.

In addition to the controlling and guiding mentioned above the current state of the system and evacuation instructions may be shown to persons in the building or in the public place or happening. For example, similar system may be applied to sport events. For example, a soccer stadium having elevators for handicapped people and escalators to a subway station below the stadium. In such situations the evacuation involves even more people than in cases involving large building. Particularly handicapped persons may have problems to get out when large masses of people try to get out. In such situation it could be helpful that the location is evacuated gradually in a manner provides fluent evacuation so that persons in the most dangerous place are evacuated first.

The above mentioned method may be implemented as computer software which is executed in a computing device able to communicate with a mobile device. When the software is executed in a computing device it is configured to perform the above described inventive method. The software is embodied on a computer readable medium so that it can be provided to the computing device, such as the controller 16 of FIG. 1.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, or any other suitable medium from which a computer can read.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for controlling a public transportation system, the method comprising:
receiving data from a plurality of data collection devices, including at least one profile of at least one passenger provided prior to receipt of an evacuation signal, from a plurality of data collection devices connected to different types of apparatuses, wherein one of said data collection devices is configured to measure a passenger flow, including a number of passengers in the passenger flow and flow direction, within a specified area to estimate passenger traffic using a particular public transportation and provides information about passengers of the passenger flow, and one of said data collection devices receives information from an access card including additional information describing a handicap or need for a wheel chair;
analyzing said received data;
providing a current state of an environment of the data collection devices based on said analyzed received data; and
as a response to an evacuation signal,
changing a flow direction of at least one passenger flow measured by one of the data collection devices connected to different types of apparatuses; and
displaying evacuation instructions based on the analyzed received data and the at least one profile of at least one passenger, the evacuation instructions instructing passengers to use the changed flow direction in accordance with a determined plan;
wherein the plurality of data collection devices are connected to different types of apparatuses including at least one of automatic walkways, escalators, and lighting; and
accumulating said analyzed data into statistics, this statistics providing real-time information to said public transportation system based on the determined plan.

2. The method according to claim 1, wherein the public transportation system includes at least one elevator group and evacuation instructions for said at least one elevator group are based on said analyzed data, wherein said at least one elevator group is connected to at least one data collection device.

3. The method according to claim 1, wherein the method is further comprises displaying route instructions to passengers based on the analyzed data.

4. A non-transitory computer- readable storage medium encoded with instructions that, when executed by one or more computers, cause the one or more computers to perform operations for controlling a public transportation system comprising:

receiving data from a plurality of data collection devices, including at least one profile of at least one passenger provided prior to receipt of an evacuation signal, from a plurality of data collection devices connected to different types of apparatuses, wherein one of said data collection devices is configured measure a passenger flow, including a number of passengers in the passenger flow and flow direction, within a specified area to estimate passenger traffic using a particular public transportation and provides information about passengers of the passenger flow, and one of said data collection devices receives information from an access card including additional information describing a handicap or need for a wheel chair;

analyzing said received data;

providing a current state of an environment of the data collection devices based on said analyzed received data; and as a response to an evacuation signal, changing a flow direction of at least one passenger flow measured by one of the data collection devices connected to different types of apparatuses; and displaying evacuation instructions based on the analyzed received data and the at least one profile of at least one passenger, the evacuation instructions instructing passengers to use the changed flow direction in accordance with a determined plan;

wherein data from the plurality of data collection devices connected to different types of apparatuses including at least one of automatic walkways, escalators, and lighting and includes statistics or a traffic forecast; and accumulating said analyzed data into statistics, this statistics providing real-time information to said public transportation system based on the determined plan.

5. An apparatus configured to control a public transportation system comprising:

processor;

at least one memory;

a network connection; wherein the apparatus is configured to: receive data from a plurality of data collection devices, including at least one profile of at least one passenger provided prior to receipt of an evacuation signal, from a plurality of data collection devices connected to different types of apparatuses, wherein one of said data collection devices is configured to measure a passenger flow including a number of passengers in the passenger flow and flow direction, within a specified area to estimate passenger traffic using a particular public transportation and provide information about passengers of the passenger flow, and one of said data collection devices receives information from an access card including additional information describing a handicap or need for a wheel chair;

the processor configured to:

analyze said received data;

provide a current state of an environment of the data collection devices based on said analyzed received data;

change a flow direction of at least one passenger flow measured by one of the data collection devices connected to different types of apparatuses as a response to an evacuation signal; and display evacuation instructions based on the analyzed received data and the at least one profile of at least one passenger; as a response to the evacuation signal; the evacuation instructions instructing passengers to use the changed flow direction in accordance with a determined plan;

wherein the apparatus is configured to control at least one elevator group based on one of the following: statistics or a traffic forecast;

wherein the plurality of data collection devices are connected to different types of apparatuses including at least one of automatic walkways, escalators, and lighting; and wherein the apparatus is configured to accumulate said analyzed data into statistics, the statistics providing real-time information to said public transportation system based on the determined plan;

wherein the apparatus is configured to control the transportation system based on the statistics or a traffic forecast.

6. The apparatus according to claim 5, wherein in the apparatus is further configured to control at least one elevator group of the public transportation system based on said analyzed data, wherein said at least one elevator group is connected to at least one data collection device.

7. The apparatus according to claim 5, wherein the method is the apparatus is further configured to display route instructions to passengers based on the analyzed data.

8. The method according to claim 1, wherein the public transportation system includes at least one elevator group and evacuation instructions for said at least one elevator group are based on said analyzed data, wherein said at least one elevator group is connected to at least one data collection device.

9. The method according to claim 1, wherein the data from a plurality of data collection devices connected to different types of apparatuses includes: said current state of the environment, statistics or a traffic forecast.

10. The method according to claim 2, wherein the data from a plurality of data collection devices connected to different types of apparatuses includes: said current state of the environment, statistics or a traffic forecast.

* * * * *